United States Patent
Dodel

(10) Patent No.: US 7,460,828 B2
(45) Date of Patent: Dec. 2, 2008

(54) METHOD AND ARRANGEMENT FOR AN ALTERNATIVE SIGNAL PATH IN A NAVIGATION TRANSMITTER

(75) Inventor: Hans Dodel, Gautling (DE)

(73) Assignee: EADS Deutschland GmbH, Ottobrunn (DE)

( * ) Notice: Subject to any disclaimer, the term of this patent is extended or adjusted under 35 U.S.C. 154(b) by 647 days.

(21) Appl. No.: 11/004,226

(22) Filed: Dec. 6, 2004

(65) Prior Publication Data
US 2005/0157672 A1 Jul. 21, 2005

(30) Foreign Application Priority Data
Dec. 4, 2003 (DE) ................................ 103 56 580

(51) Int. Cl.
H04B 7/185 (2006.01)
H04B 7/19 (2006.01)
H04Q 7/20 (2006.01)

(52) U.S. Cl. ..................... 455/12.1; 455/13.1; 455/427; 455/428

(58) Field of Classification Search ................ 455/12.1, 455/13.1, 13.3, 427, 419, 431, 428, 429; 342/353; 370/325
See application file for complete search history.

(56) References Cited

U.S. PATENT DOCUMENTS

| 5,619,211 A | 4/1997 | Horkin et al. |
| 5,627,546 A * | 5/1997 | Crow .......................... 342/352 |
| 6,185,409 B1 * | 2/2001 | Threadgill et al. .......... 455/12.1 |
| 6,243,580 B1 * | 6/2001 | Garner ........................ 455/428 |
| 6,708,029 B2 * | 3/2004 | Wesel .......................... 455/428 |
| 6,954,614 B2 * | 10/2005 | Jespersen ................... 455/13.3 |
| 7,020,462 B1 * | 3/2006 | Wesel .......................... 455/427 |
| 7,218,932 B2 * | 5/2007 | Hutchinson ................. 455/427 |
| 2003/0067409 A1 | 4/2003 | Murphy |

FOREIGN PATENT DOCUMENTS

DE 196 43 675 A1 4/1997

OTHER PUBLICATIONS

J.P. Provenzano, A. Masson, S. Journo, C. Laramas, J.I. Damidaux and F. Zwolska, Implementation of a European Infrastructure for Satellite Navigation: From System Design to Advanced Technology Evaluation, 2000, pp. 223-242, John Wiley & Sons, Ltd.

S. Badessi, G. Oppenäuser, J. Ventura-Traveset, F. Palamidessi and G. Leggeri, SNAV: SBAS Self-Standing Navigation Payload Based on Artemis Experience, pp. 1-6.

* cited by examiner

Primary Examiner—Tilahun B Gesesse
(74) Attorney, Agent, or Firm—Crowell & Moring LLP

(57) ABSTRACT

Navigation signals emitted by a navigation transmitter (46), in a first signal path (41), have a time reference generated and, based on this time reference, navigation signals are generated which are subsequently emitted by way of a transmitting device (39, 40). In the event of interferences in the first signal path (41), a switch-over takes place to a second signal path (45) parallel to the first signal path (41). The navigation transmitter (46) receives time reference signals and/or navigation signals, and the received signals are guided by way of the second signal path (45) to the transmitting device (39, 40) and emitted.

20 Claims, 1 Drawing Sheet

METHOD AND ARRANGEMENT FOR AN ALTERNATIVE SIGNAL PATH IN A NAVIGATION TRANSMITTER

This application claims the priority of German Application DE 103 56 580.9, filed Dec. 4, 2003, the entire disclosure of which is expressly incorporated by reference herein.

BACKGROUND AND SUMMARY OF THE INVENTION

The present invention relates to a method of emitting navigation signals by a navigation transmitter as well as to a navigation satellite.

Satellite navigation systems, such as GPS, GLONASS and also the future European system with the project name Galileo, are sufficiently known from the prior art. Reference is made, for example, to J. P. Provenzano et al. "Implementation of a European Infrastructure for Satellite Navigation: From System Design to Advanced Technology Evaluation", *Int. J. Satell. Commun.* 2000; 18:223-242.

Furthermore, systems for increasing the precision of the above-mentioned satellite navigation systems, such as the EGNOS (European Geostationary Navigation Overlay Service) System, are described in the prior art. Reference is made here, for example, to S. Badessi et al: "SNAV:SBAS Self-Standing Navigation Payload Based on Artemis Experience", retrievable on the Internet under http://esamultimedia.esa.int/docs/egnos/estb/Publications/GNSS%201999/GNSS99_SNAV.pdf FIG. 1 shows a payload conception corresponding to the EGNOS system with transparent transponders which are fed from a ground control station by utilizing an uplink. In this case, the ground control segment takes over the path measurements, the operation of the master clock (in the central master station) as the time reference, the synchronization of the master clock with the clocks in the ground control stations and the transmission of navigation signals to the EGNOS payload which the latter transmits largely transparently to the transmission devices of the communication payload of the EGNOS satellite. Particularly the time reference of this system is therefore situated outside the EGNOS satellite which acts as a navigation transmitter with respect to navigation transmit equipment.

FIG. 2 illustrates a payload conception with an onboard atomic clock as the time reference which is controlled only by way of the uplink. This type of conception is used, for example, in the case of the GPS and Galileo. However, this atomic clock is the most critical element of the navigation payload. It is sensitive and its life expectancy is limited. If this very sensitive atomic clock fails in the satellite, the satellite will be useless. However, the exchange of a complete satellite requires high costs and expenditures.

Similar problems may also occur in the case of other navigation transmitters, for example, fixedly or movably installed terrestrial navigation transmitters.

It is an object of the present invention to provide a possibility for reducing the susceptibility of navigation transmitters to interferences.

A first object of the present invention is a navigation satellite, having at least one receiving device for the receiving at least control signals and a transmitting device for sending navigation signals. The navigation satellite also includes a first signal path between the receiving device and the transmitting device which has at least the following:

A signal generating device for generating navigation signals and
a time reference device which is connected with the signal generating device.

According to the invention, a second signal path is provided parallel to the first signal path while bypassing the signal generating device and the time reference device. The first signal path or the second signal path can optionally be connected by at least one switch-over device with the receiving device and/or the transmitting device.

As a result of these technical measures, an alternative interference-free signal path can be cleared in the event of an interference in the first signal path, particularly in the event of an interference in the signal generating device and/or in the time reference device. This alternative signal path bypasses at least the signal generating device and the time reference device. Particularly, in the case of an interference of the time reference device, this creates the possibility of feeding time reference signals from another time reference source to the transmitting device. The optional switchable connection of the first or second signal path can either take place only at the receiving device, only at the transmitting device or at the receiving device and the transmitting device.

A further development of the invention provides that the receiving device is connected by way of an identification-selective device with the first signal path and the second signal path, and the first signal path and the second signal path can be connected by way of a switch-over device optionally with the transmitting device. In this case, the first and the second signal path can always remain connected with the receiving device. Signals intended for the first signal path can then, corresponding to their identification, be fed to the first signal path, and signals intended for the second signal path, corresponding to their identification, can be fed to the second signal path. Any suitable physical or data-related description of the signals can be used as the identification, such as the frequency, the phase, the amplitude, the polarization direction, the modulation code (for example, in the case of CDMA), the bit structure, the header information of data packets, etc.

Thus, it can particularly be provided that the receiving device is connected by way of a frequency divider network with the first signal path and the second signal path. In this case, the frequency of the signal is therefore the identification according to which the signals can be selected corresponding to their destination for the first or second signal path.

However, as an alternative, it can also be provided that the receiving device is connected with the first signal path and the second signal path by way of a device for the selection of code-modulated signals. This measure can be selected when signals are transmitted in a CDMA (Code Division Multiple Access) process to the navigation satellite. In this case, the respective CDMA modulation code is used as the identification.

The second signal path can now be further developed such that it replaces interferences occurring in the first signal path and supplies corresponding replacement signals for signals which are subject to interferences or are absent in the first signal path. The second signal path may, in particular, have a signal processing function which differs from the first signal path. Thus, for example, the signal processing function of the second signal path may comprise only a frequency converter and/or a code converter. In this case, the replacement signals are not generated in the navigation transmitter itself but are received by way of the receiving device and are supplied by way of the identification-selective device to the second signal path which processes the signals only for a matching emission by way of the transmitting device.

Another object of the present invention is a method of emitting navigation signals by a navigation transmitter. In this case, a time reference is generated in a first signal path, and navigation signals are generated based on this time reference and are subsequently emitted by way of a transmitting device. According to the invention, in the event of interferences in the first signal path, a switch-over takes place to a second signal path parallel to the first signal path; the navigation transmitter receives time reference signals and/or navigation signals; and the received signals are guided by way of the second signal path to the transmitting device and are emitted.

Thus, when an interference occurs in the first signal path of the navigation transmitter so that time reference signals and/or navigation signals can no longer be generated or can only be generated in a faulty manner, a switch-over to the second signal path takes place, in which case, however, the time reference signals and/or the navigation signals are then received from the outside and are guided by way of the second signal path to the transmitting device and are emitted. This represents a very simple, fast and cost-effective measure for continuously maintaining the operation of the navigation transmitter despite an internal disturbance.

A further development of this method provides that, at least when there is no interference in the operation of the first signal path, at least control signals with a first identification are received by the navigation transmitter and, corresponding to their identification, are fed to the first signal path and, at least when there are interferences in the first signal path, time reference signals and/or navigation signals with a second identification are received by the navigation transmitter and, corresponding to their identification, are fed to the second signal path. The signals with the first and second identification can also be constantly transmitted to the navigation transmitter. However, preferably the time reference signals and/or the navigation signals will not be transmitted to the navigation transmitter before an interference has occurred in the first signal path. The distribution of the signals to the signal paths corresponding to their identification can take place by the above-mentioned identification-selective device. All above-mentioned types of identification can be used as the identification. Thus, a redundant source of time reference signals and/or navigation signals in addition to the internal source in the navigation transmitter can be created in a simple manner.

In particular, at least when there is no interference in the operation of the first signal path, at least control signals in a first frequency range are received by the navigation transmitter, are filtered according to their frequency and are fed to the first signal path, and, at least when there are interferences in the first signal path, time reference signals and/or navigation signals in a second frequency range are received by the navigation transmitter, are filtered according to their frequency, and are fed to the second signal path. Thus, the frequency or the frequency range in which the signals are transmitted to the navigation transmitter are used as the identification for the different received signals.

However, as an alternative, it may also be provided that, at least when there is no interference in the operation of the first signal path, at least control signals with a first code modulation are received by the navigation transmitter, are selected according to their modulation code, and are fed to the first signal path; and at least when interferences exist in the first signal path, time reference signals and/or navigation signals with a second code modulation are received by the navigation transmitter, are selected according to their modulation code, and are fed to the second signal path. This applies, for example, to the case of a CDMA modulation of the signals which are sent to the navigation transmitter.

Analogous to the above-mentioned statements concerning the navigation transmitter, it can also be provided here that the signal processing on the first signal path differs from the signal processing on the second signal path. Thus, it can be provided that, on the second signal path, a signal processing takes place only within the scope of a frequency conversion and/or a code conversion.

A further development of the invention provides that, at least in the event of interferences in the first signal path, time reference signals are received by the navigation transmitter which are emitted from a distant transmitting station with a time shift in such a manner that, after the reception and processing of the received time reference signal by the navigation transmitter, the time reference signal to be emitted by the navigation transmitter is synchronous with the undisturbed internal time reference of the navigation transmitter. Thus, the time reference signals from a distance transmitting station are provided with a time shift such that, after the transit through the signal route to the transmitting device of the navigation transmitter, the position of the time reference signals is identical with that which the internal time reference signals of the navigation transmitter should have in the undisturbed case. Thus, apparently nothing changes for a navigation receiver. It receives time reference signals which are absolutely identical and synchronous with the previously undisturbed internal time reference signals of the navigation transmitter.

Other objects, advantages and novel features of the present invention will become apparent from the following detailed description of the invention when considered in conjunction with the accompanying drawings.

BRIEF DESCRIPTION OF THE DRAWINGS

The present invention will be explained in the following on the basis of FIGS. 1 to 3 by means of a navigation satellite.

DETAILED DESCRIPTION OF THE DRAWINGS

Figure 1:
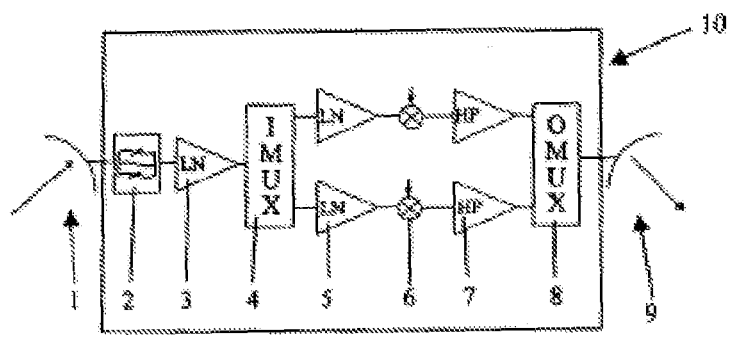
FIG. 1 is a view of a payload conception with a transparent signal path according to the state of the art.

FIG. 1 is a first navigation payload concept-ion for a satellite 10 according to the prior art which has a transparent signal path for navigation signals and/or time reference signals. The navigation signals and/or time reference signals are transmitted by a ground control station, which is not shown, by utilizing an uplink to the navigation satellite 10 which receives the signals by way of a receiving device consisting of a receiving antenna 1, a band pass filter 2 and an input amplifier 8 (low noise amplifier LNA). The received signals are distributed to several partial paths by an input multiplexer (IMUX) acting essentially as a divider network 4. Subsequently, the preamplifier 5 (low noise amplifier LNA), the frequency converter 6 and the transmission amplifier 7 (high power amplifier HPA), the output multiplexer 8 (OMUX) as well as the transmitting antenna 9 for emitting the navigation signals and/or the time reference signals are provided. Thus, no generating of the navigation signals and/or the time reference signals takes place onboard the navigation satellite 10 itself.

Figure 2:
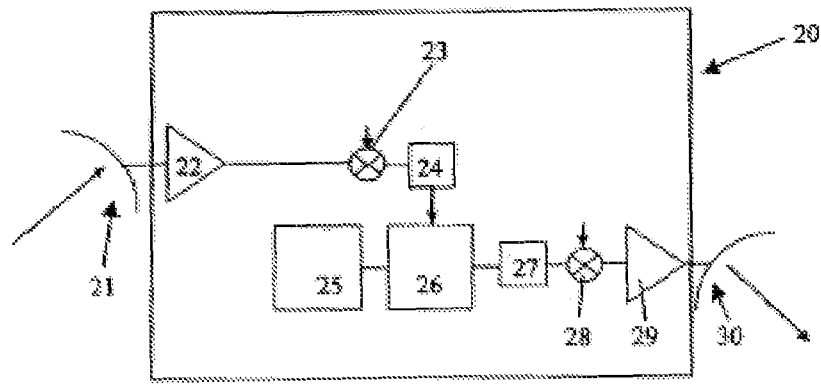
FIG. 2 is a view of the payload architecture with an onboard signal generation.

FIG. 2 illustrates another payload conception for a navigation satellite 20 according to the prior art with an onboard atomic clock as the time reference 25. The latter is used as the basis for generating navigation signals and/or time reference signals in a signal generating device 26. By way of an encoder/modulator 27, the navigation signals and/or time reference signals are fed to a frequency converter 28 and are subsequently emitted by way of a transmission amplifier 29 and a transmitting antenna 30. The generating of the navigation signals and/or time reference signals in the navigation satellite 20 is checked only by way of control signals via the uplink from a ground station which is not shown. The control signals are received by way of a receiving device consisting of the receiving antenna 21 and the preamplifier 22 and are fed to the signal generating device 26 by way of a frequency converter 23 and a demodulator 24. However, if the time reference 25 fails in this arrangement, the navigation satellite 20 becomes useless.

Figure 3:
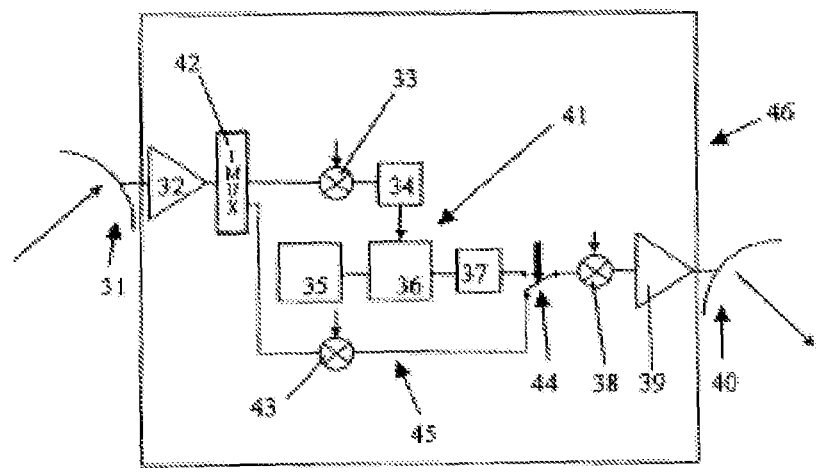
FIG. 3 is a view of the payload architecture with an onboard signal generation and the second transparent signal path.

FIG. 3 illustrates an example of a navigation satellite 46 according to the present invention. Control signals in a first frequency band emitted by a ground station, which is not shown, are received by means of a receiving device consisting of the receiving antenna 31 and the preamplifier 32 and are fed to an input multiplexer 42 which acts essentially as a frequency divider network. A first signal path 41 is then provided, in which case the control signals are fed to a signal generating device 36 by way of a frequency converter 33 and a demodulator 34. The signal generating device 36 is connected with an on board atomic clock as the time reference 35. The latter is used as the basis for generating navigation signals and/or time reference signals in the signal generating device 36. The generated navigation signals and/or time reference signals are fed to an encoder modulator 37.

A second signal path 45, which also branches off the input multiplexer 42, extends parallel to this first signal path. This second signal path 45 comprises only a frequency converter 43.

Both signal paths 41, 45 are connected with a switching device 44 by means of which optionally the first signal path 41 or the second signal path 45 can be connected by way of a frequency converter 38 with a transmitting device consisting of a transmission amplifier 39 and a transmitting antenna 40.

First, the first signal path 41 is connected by way of the frequency converter 38 with the transmitting device as long as the components of the first signal path 41 operate without interference. If an interference now occurs in the first signal path 41, particularly a disturbance of the time reference 35, so that the navigation signals and/or the time reference signals in the first signal path 41 are no longer generated or are generated only in a faulty manner, the switching device 44 separates the first signal path 41 from the transmitting device and connects the second signal path 45 with the transmitting device. Subsequently, navigation signals and/or time reference signals are transmitted from the ground station in a second frequency band to the navigation satellite 46. These are received by way of the receiving device consisting of the receiving antenna 31 and the preamplifier 32 and are fed to the input multiplexer 42. The input multiplexer 42 feeds the signals of this second frequency band to the second signal path 45. The navigation signals and/or time reference signals are then fed to the frequency converter 43 and, while bypassing the signal generating device 36 and the time reference 35, are transmitted by way of the switching device 44 and the frequency converter 38 to the transmitting device consisting of the transmission amplifier 39 and the transmitting antenna 40. As result, also in the event of an interference in the first signal path 41, the emission of navigation signals and time reference signals by way of the navigation satellite 46 is ensured.

Therefore, in the event of a disturbance, time reference signals continue to be sent out from the navigation satellite 46 which are synchronous with those time reference signals which were emitted from the navigation satellite 46 before the occurrence of the disturbance. To accomplish this, the time reference signals are transmitted with a time shift relative to the internal time reference of the navigation satellite 46 from the ground station to the navigation satellite 46. This time shift corresponds to the signal transit time from the ground station to the navigation satellite. In addition, the different signal transit times of the time reference signals in the first signal path 41 and the second signal path 45 can be taken into account as an additional time shift.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Navigation satellite system comprising:
    at least one receiving device for receiving at least control signals;
    a transmitting device for emitting navigation signals;
    a first signal path circuit between the receiving device and the transmitting device, said first signal path circuit including a signal generating device for generating navigation signals and a time reference device which is connected with the signal generating device,
    a second signal path circuit provided parallel to the first signal path circuit while bypassing the signal generating device and the time reference device; and
    at least one change-over device that connects one of the first signal path circuit and the second signal path circuit with the receiving device and the transmitting device based on whether navigation and/or time reference signals can no longer be generated by the first signal path circuit or can only be generated in a faulty manner.

2. Navigation satellite according to claim 1, wherein the receiving device is connected by way of an identification-selective device with the first signal path circuit or the second signal path circuit, and the first signal path circuit and the second signal path circuit are able to be connected, by way of said at least one change-over device, with the transmitting device.

3. Navigation satellite according to claim 2, wherein said identification selective device is a frequency divider network.

4. Navigation satellite according to claim 3, wherein the second signal path circuit comprises at least one of a frequency converter and a code converter for signal processing.

5. Navigation satellite according to claim 2, wherein said identification selective device is a device for the selection of code-modulated signals.

6. Navigation satellite according to claim 5, wherein the second signal path circuit comprises at least one of a frequency converter and a code converter for signal processing.

7. Navigation satellite according to claim 2, wherein the second signal path circuit comprises at least one of a frequency converter and a code converter for signal processing.

8. Navigation satellite according to claim 1, wherein the second signal path circuit comprises at least one of a frequency converter and a code converter for signal processing.

9. Method of emitting navigation signals by a navigation transmitter comprising the steps:
    generating a time reference in a first signal path;
    generating navigation signals in said first signal path as a function of said time reference which are subsequently emitted by a transmitting device;

switching over in the event of interferences in the first signal path to a second signal path parallel to the first signal path wherein when the navigation transmitter receives at least one of time reference signals and navigation signals, the received signals are guided by way of the second signal path to the transmitting device and are emitted.

10. Method according to claim 9, wherein at least when there is no interference in the operation of the first signal path, at least control signals with a first identification are received by the navigation transmitter and, corresponding to their identification, are fed to the first signal path, and at least in the event of interferences in the first signal path, time reference signals and/or navigation signals with a second identification are received by the navigation transmitter and, corresponding to their identification, are fed to the second signal path.

11. Method according to claim 10, wherein at least when there is no interference in the operation of the first signal path, at least control signals in a first frequency range are received by the navigation transmitter, are filtered according to their frequency and are fed to the first signal path, and, at least when there are interferences in the first signal path, time reference signals and/or navigation signals in a second frequency range are received by the navigation transmitter, are filtered according to their frequency, and are fed to the second signal path.

12. Method according to claim 11, wherein, on the second signal path, a signal processing takes place only within the scope at least one of a frequency conversion and a code conversion.

13. Method according to claim 10, wherein at least when there is no interference in the operation of the first signal path, at least control signals with a first code modulation are received by the navigation transmitter, are selected according to their modulation code, and are fed to the first signal path and at least when interferences exist in the first signal path, time reference signals and/or navigation signals with a second code modulation are received by the navigation transmitter, are selected according to their modulation code, and are fed to the second signal path.

14. Method according to claim 10, wherein, on the second signal path, a signal processing takes place only within the scope at least one of a frequency conversion and a code conversion.

15. Method according to claim 10, wherein at least in the event of interferences in the first signal path, time reference signals are received by the navigation transmitter which are emitted from a distant transmitting station with a time shift in such a manner that, after the reception and processing of the received time reference signals by the navigation transmitter, the time reference signals to be emitted by the navigation transmitter are each synchronous with the undisturbed internal time reference of the navigation transmitter.

16. Method according to claim 9, wherein, on the second signal path, a signal processing takes place only within the scope at least one of a frequency conversion and a code conversion.

17. Method according to claim 9, wherein at least in the event of interferences in the first signal path, time reference signals are received by the navigation transmitter which are emitted from a distant transmitting station with a time shift in such a manner that, after the reception and processing of the received time reference signals by the navigation transmitter, the time reference signals to be emitted by the navigation transmitter are each synchronous with the undisturbed internal time reference of the navigation transmitter.

18. A navigation satellite system comprising:
a receiving device;
a transmitting device;
a first signal circuit connected between the receiving device and the transmitting device;
a second signal circuit connected between the receiving device and the transmitting device in parallel with the first signal circuit;
a control device which when receiving first input signal as control signals outputs said control signals to said first signal circuit for transmission to said transmitting device and wherein said first signal circuit converts said control signals to at least one of navigation signals and time reference signals and, when said control device receives at least one of navigation and time reference signals said control device outputs said at least one of navigation and time reference signals to said transmitter through said second signal circuit.

19. The system according to claim 18, wherein said first signal circuit includes a signal generating device and a time reference device.

20. The system according to claim 18, further including a switch-over device for changeably connecting one of said first signal circuit and said second signal circuit to said transmitting device.

* * * * *